US012767532B2

(12) United States Patent
Cheng et al.

(10) Patent No.: US 12,767,532 B2
(45) Date of Patent: Oct. 20, 2026

(54) METHOD FOR PREPARING SULFURYL FLUORIDE BY USING SULFURYL CHLORIDE FLUORINATION

(71) Applicants: CONTEMPORARY AMPEREX TECHNOLOGY CO., LIMITED, Ningde (CN); CATL-SICONG NOVEL MATERIALS CO., LTD, Longyan (CN)

(72) Inventors: Sicong Cheng, Ningde (CN); Qisen Huang, Ningde (CN)

(73) Assignees: CONTEMPORARY AMPEREX TECHNOLOGY CO., LIMITED, Ningde (CN); CATL-SICONG NOVEL MATERIALS CO., LTD., Longyan (CN)

( * ) Notice: Subject to any disclaimer, the term of this patent is extended or adjusted under 35 U.S.C. 154(b) by 434 days.

(21) Appl. No.: 18/511,675

(22) Filed: Nov. 16, 2023

(65) Prior Publication Data

US 2024/0101421 A1 Mar. 28, 2024

Related U.S. Application Data

(63) Continuation of application No. PCT/CN2022/074947, filed on Jan. 29, 2022.

(51) Int. Cl.
*C01B 17/45* (2006.01)

(52) U.S. Cl.
CPC ................................ *C01B 17/4576* (2013.01)

(58) Field of Classification Search
None
See application file for complete search history.

(56) References Cited

U.S. PATENT DOCUMENTS

| | | | |
|---|---|---|---|
| 2,772,144 A | 11/1956 | Belf | |
| 3,431,088 A | 3/1969 | Huber et al. | |
| 6,723,874 B1 * | 4/2004 | Braun | C07C 51/58 562/852 |
| 7,145,046 B2 | 12/2006 | Braun et al. | |
| 2021/0053913 A1 * | 2/2021 | Zhou | C07C 303/40 |

FOREIGN PATENT DOCUMENTS

| | | |
|---|---|---|
| CN | 1328537 A | 12/2001 |
| CN | 1489560 A | 4/2004 |
| CN | 1678520 A | 10/2005 |
| CN | 103864022 A | 6/2014 |

(Continued)

OTHER PUBLICATIONS

CN-106946231-A abstract (Year: 2017).*

(Continued)

*Primary Examiner* — Guinever S Gregorio
(74) *Attorney, Agent, or Firm* — ANOVA LAW GROUP, PLLC

(57) ABSTRACT

A method for efficiently preparing sulfuryl fluoride by using sulfuryl chloride fluorination includes sulfuryl fluoride synthesis, where a solvent and a hydrogen fluoride complex are added to a reaction kettle, the reaction system is cooled to 10° C. or less, and sulfuryl chloride is then added dropwise under atmospheric pressure while the temperature of the reaction system is controlled to 60° C. or less to obtain sulfuryl fluoride.

15 Claims, 1 Drawing Sheet

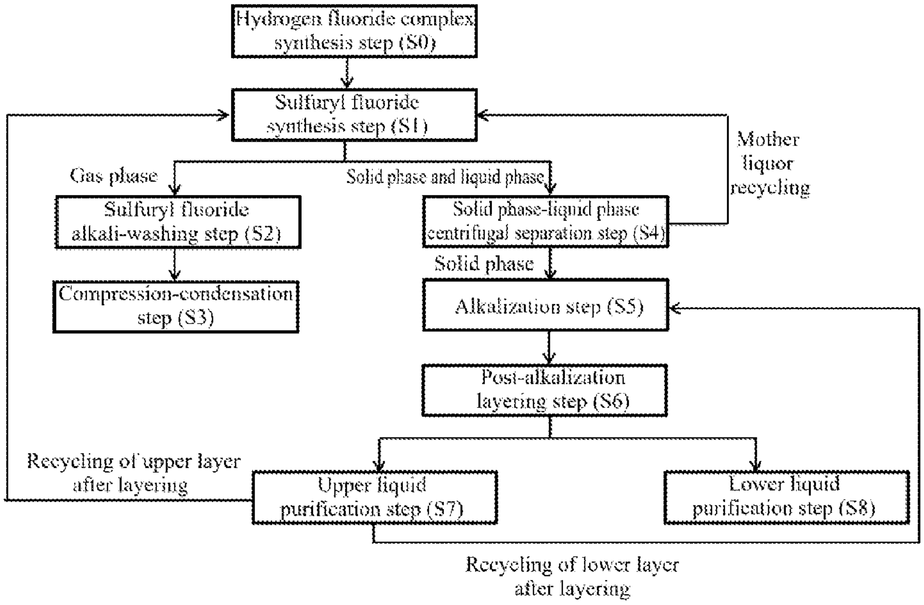

(56) References Cited

FOREIGN PATENT DOCUMENTS

| | | | |
|---|---|---|---|
| CN | 106946231 | A | 7/2017 |
| CN | 206526789 | U | 9/2017 |
| DE | 10320314 | A1 | 12/2004 |
| TW | 572889 | B | 1/2004 |

OTHER PUBLICATIONS

The European Patent Office (EPO) The Extended European Search Report for Application No. 22922862.2 Jun. 11, 2024 7 Pages.
The World Intellectual Property Organization (WIPO) International Search Report for PCT/CN2022/074947 Oct. 17, 2022 7 pages (including English translation).
The China National Intellectual Property Administration (CNIPA) The Concise Explanation of Relevance for Chinese Application 202210110583.8 Sep. 21, 2022 9 Pages (With Translation).

* cited by examiner

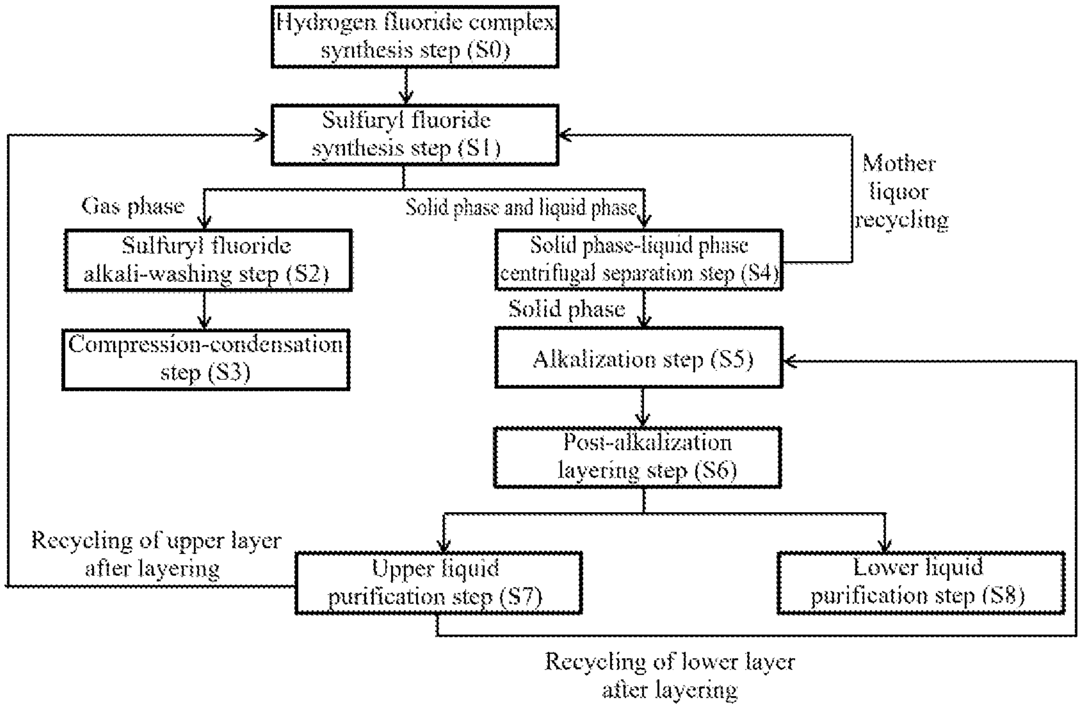
Hydrogen fluoride complex synthesis step (S0)
Sulfuryl fluoride synthesis step (S1)
Gas phase
Solid phase and liquid phase
Mother liquor recycling
Sulfuryl fluoride alkali-washing step (S2)
Solid phase-liquid phase centrifugal separation step (S4)
Compression-condensation step (S3)
Solid phase
Alkalization step (S5)
Post-alkalization layering step (S6)
Recycling of upper layer after layering
Upper liquid purification step (S7)
Lower liquid purification step (S8)
Recycling of lower layer after layering

METHOD FOR PREPARING SULFURYL FLUORIDE BY USING SULFURYL CHLORIDE FLUORINATION

CROSS-REFERENCE TO RELATED APPLICATION

This application is a continuation of International Application No. PCT/CN2022/074947, filed on Jan. 29, 2022, the entire content of which is incorporated herein by reference.

TECHNICAL FIELD

The present application relates to the field of the synthesis of industrial chemicals, particularly to a method for preparing sulfuryl fluoride by using sulfuryl chloride fluorination.

BACKGROUND ART

Sulfuryl fluoride ($SO_2F_2$) is a colorless and odorless gas at room temperature under atmospheric pressure, has chemical inertness and is easy to decompose at a high temperature. Sulfuryl fluoride has the characteristics of a strong diffusion permeability, broad-spectrum insect killing, dosage economy, a low residual amount, a high insect-killing speed, a short gas dispersion time, usability at a low temperature, no effects on germination rate, a low toxicity, etc., and is thus more and more widely used in warehouses, cargo ships, containers, buildings, reservoir dams, termite control, and the control of overwintering pests in gardens and trunk-boring pests in living trees. Moreover, when used as an insecticide, a microbicide and a fumigant, sulfuryl fluoride does not destroy the ozone layer in the atmosphere and therefore is widely used in these fields.

In recent years, sulfuryl fluoride has begun to be used as a raw material for the synthesis of lithium bisfluorosulfonimide. Lithium bisfluorosulfonimide, as a novel lithium salt electrolyte material with a wide application prospect for lithium ion batteries, can improve the cycling performance and rate capability of a power battery when used in the power battery. Therefore, sulfuryl fluoride also has very good development prospects in the field of lithium-ion batteries.

At present, common methods for preparing sulfuryl fluoride include: direct fluorination using sulfur dioxide and fluorine gas as main raw materials; an anhydrous hydrofluoric acid method using sulfur dioxide, chlorine gas and anhydrous hydrofluoric acid as raw materials; a nitrosyl fluoride method using sulfur dioxide and nitrosyl fluoride as main raw materials; a sulfuryl chloride fluorination method, wherein sulfuryl chloride is fluorinated to synthesize sulfuryl fluoride; a fluorosulfonic acid method using fluorosulfonic acid and barium chloride as main raw materials; etc. Among them, the sulfuryl chloride fluorination method is one of the common sulfuryl fluoride synthesis methods. However, when the sulfuryl chloride fluorination method is used in an existing process for preparing sulfuryl fluoride, problems such as a high production cost, a low product purity, and unsuitability for industrial production are widespread.

Therefore, how to provide a method for efficiently preparing sulfuryl fluoride so as to reduce the production cost, improve the product purity and be suitable for industrial production is an urgent problem to be addressed by a person skilled in the art.

SUMMARY

The present application is made in view of the above problems, and aims to provide a method for preparing sulfuryl fluoride by using sulfuryl chloride fluorination. The method can reduce the production cost, improve the product purity and is suitable for industrial production.

In order to achieve the above object, in a first aspect, the present application provides a method for preparing sulfuryl fluoride by using sulfuryl chloride fluorination. The method comprises a sulfuryl fluoride synthesis step, wherein a solvent and a hydrogen fluoride complex are added to a reaction kettle, and after the reaction system is cooled to 10° C. or less, sulfuryl chloride is added dropwise under atmospheric pressure while the temperature of the reaction system is controlled to be 60° C. or less to obtain sulfuryl fluoride.

Since the reaction of the hydrogen fluoride complex and sulfuryl chloride for synthesizing sulfuryl fluoride is an exothermic reaction, during the dropwise addition of sulfuryl chloride, the reaction temperature may locally rise, resulting in reaction bumping. Moreover, once the reaction temperature rises, the solvent may be evaporated and mixed into the product sulfuryl fluoride gas so that the yield and purity of sulfuryl fluoride are reduced. In the present application, by cooling the reaction system to 10° C. or less before the dropwise addition of sulfuryl chloride in the sulfuryl fluoride synthesis step, the reaction system is controlled in a temperature environment by which the reaction can proceed and the product purity is high, and by controlling the reaction temperature to be 60° C. or less throughout the dropwise addition of sulfuryl chloride, the reaction temperature can be effectively prevented from local rise to cause reaction bumping, the safety hazard is reduced during industrial production, and the yield and purity of sulfuryl fluoride can be improved; therefore, sulfuryl fluoride can be prepared efficiently.

In any embodiment, the temperature of the reaction system is controlled to be 20° C. to 45° C.

In the present application, by controlling the temperature of the reaction system to be 20° C. to 45° C., the reaction temperature can be more effectively prevented from local rise to cause reaction bumping, the safety hazard is reduced during industrial production, and the yield and purity of sulfuryl fluoride can be improved; therefore, sulfuryl fluoride can be prepared efficiently.

In any embodiment, the method of the present application further comprises a hydrogen fluoride complex synthesis step, wherein a hydrogen fluoride complex represented by $R\cdot(HF)_n$ is synthesized by an acid-binding agent and hydrogen fluoride, wherein R represents an acid-binding agent molecule, n represents a number greater than 0 and less than 12, and optionally, n represents a number greater than 2 and less than 12.

In the present application, by using such a hydrogen fluoride complex, the reaction of the hydrogen fluoride complex and sulfuryl chloride can be smoothly performed at the controlled temperature in the present application to generate sulfuryl fluoride, and the quality of sulfuryl fluoride and the safety of the process can be ensured.

In any embodiment, the above acid-binding agent is an organic weak alkali, optionally, the acid-binding agent is selected from organic tertiary amine or an azaaromatic hydrocarbon compound, and optionally, the acid-binding agent is at least one selected from trimethylamine, triethylamine, tri-n-propylamine, tri-n-butylamine, diisopropylethylamine, N,N,N,N-tetramethylpropanediamine and pyridine.

These substances are all common basic chemicals that have the characteristics of a low price, mild reaction conditions, a simple process operation, etc. In the present application, by using these substances as acid-binding agents, the synthesis reaction of the hydrogen fluoride complex can be smoothly performed, and the production cost of sulfuryl fluoride can be reduced.

In any embodiment, the above hydrogen fluoride complex is at least one selected from an organic tertiary amine·hydrogen fluoride complex and an azaaromatic hydrocarbon·hydrogen fluoride complex, and optionally, the above hydrogen fluoride complex is at least one selected from a trimethylamine·hydrogen fluoride complex, a triethylamine·hydrogen fluoride complex, a tri-n-propylamine·hydrogen fluoride complex, a tri-n-butylamine·hydrogen fluoride complex, a diisopropylethylamine·hydrogen fluoride complex, an N,N,N,N-tetramethyl·propanediamine·hydrogen fluoride complex and a pyridine·hydrogen fluoride complex.

In the present application, by using such a hydrogen fluoride complex, the reaction of the hydrogen fluoride complex and sulfuryl chloride can be smoothly performed at the controlled temperature in the present application to generate sulfuryl fluoride, and the quality of sulfuryl fluoride and the safety of the process can be ensured.

In any embodiment, the acid-binding agent is further added to the reaction system before the sulfuryl chloride is added dropwise. Preferably, the acid-binding agent added here and the acid-binding agent used in the hydrogen fluoride complex synthesis step are the same substances.

In the present application, since excess hydrogen fluoride in the synthesis reaction may be present during the feeding of the hydrogen fluoride complex, by further adding the acid-binding agent to the reaction system, the excess hydrogen fluoride can be absorbed and thus does not affect the reaction, and after absorbing hydrogen fluoride, these acid-binding agents can generate the hydrogen fluoride complex, which can further participate in the sulfuryl fluoride synthesis reaction. Moreover, since the acid-binding agent added here and the acid-binding agent used in the hydrogen fluoride complex synthesis step are the same substances, unnecessary impurity removal steps can be avoided.

In any embodiment, the above solvent is a polar aprotic organic solvent, and optionally, the above solvent is at least one selected from acetonitrile, dimethylformamide, dimethylacetamide, nitromethane, ethyl acetate, butyl acetate, dimethyl carbonate, dichloromethane and cyclohexane.

These solvents are all common basic chemicals that have the characteristics of a low price, mild reaction conditions, a simple process operation, etc. In the present application, by using these solvents, the sulfuryl fluoride synthesis reaction can be smoothly performed, and the production cost of sulfuryl fluoride can be reduced.

In any embodiment, the molar ratio of the amount of the above hydrogen fluoride complex to the amount of the sulfuryl chloride is 1:0.5 to 1:1.5, optionally 1:0.8 to 1:1.2.

In the present application, by controlling the molar ratio of the amount of the hydrogen fluoride complex to the amount of sulfuryl chloride as described above, the two can be smoothly reacted under the controlled temperature in the present application to generate the product sulfuryl fluoride, and the quality of sulfuryl fluoride and the safety of the process can be ensured.

In any embodiment, when the acid-binding agent is further added to the reaction system before the dropwise addition of the sulfuryl chloride, the molar ratio of the amount of the above acid-binding agent to the amount of the above hydrogen fluoride complex is 0.1:1 to 1:1, optionally 0.4:1 to 0.8:1.

In the present application, by controlling the molar ratio of the amount of the acid-binding agent to the amount of the hydrogen fluoride complex, excess hydrogen fluoride can be absorbed by using the acid-binding agent and thus does not affect the reaction, and after absorbing hydrogen fluoride, these acid-binding agents can generate a hydrogen fluoride complex, which can further participate in the sulfuryl fluoride synthesis reaction.

In any embodiment, the method of the present application further comprises a sulfuryl fluoride alkali-washing step, wherein sulfuryl fluoride gas obtained in the sulfuryl fluoride synthesis step is subjected to alkali washing with an alkali solution, and optionally, the method further comprises a compression-condensation step for condensing the alkali-washed sulfuryl fluoride into a liquid.

In the present application, impurities mixed into the product sulfuryl fluoride can be effectively removed by means of the sulfuryl fluoride alkali-washing step to obtain high-purity sulfuryl fluoride. In addition, the alkali-washed sulfuryl fluoride is condensed into a liquid by means of the compression-condensation step, which facilitates storage and use.

In any embodiment, the method of the present application further comprises a solid phase-liquid phase centrifugal separation step, wherein the components of a solid phase and a liquid phase resulting from the above sulfuryl fluoride synthesis step are subjected to solid-liquid separation, and a liquid phase resulting from the above solid-liquid separation is recycled in the form of a mother liquor to the above sulfuryl fluoride synthesis step.

By subjecting the solid phase and liquid phase obtained after the sulfuryl fluoride synthesis step is completed to solid-liquid separation and recycling the liquid phase in the form of a mother liquor for continued use in the above sulfuryl fluoride synthesis step, the production cost is effectively reduced and the economic benefit is improved.

In any embodiment, the method of the present application further comprises an alkalization step, wherein the solid phase resulting from the above solid-liquid separation is alkalized with an alkalization liquid.

In the present application, by alkalizing the solid phase resulting from solid-liquid separation with an alkalization liquid, the proceeding of subsequent steps is facilitated and the recycling of the raw materials is achieved.

In any embodiment, the method of the present application further comprises: a post-alkalization layering step, wherein the material obtained after the above alkalization step is separated into an upper liquid and a lower liquid; an upper liquid purification step, wherein sodium hydroxide is added to the upper liquid for layering, an upper layer obtained after layering is subjected to rectification and recovery and then recycled to the above sulfuryl fluoride synthesis step, and a lower layer obtained after layering is recycled to the above alkalization step; and a lower liquid purification step, wherein volatile components are removed from the lower liquid by means of evaporation, calcium chloride or calcium oxide is then added to remove fluorine, and sodium carbonate is then added to remove calcium.

In the present application, by means of the above post-alkalization layering step, upper liquid purification step and lower liquid purification step, all the raw materials can be fully recycled, by-products can also generate additional economic benefits after purification, and less three wastes are generated.

The present application can provide a method for preparing sulfuryl fluoride by using sulfuryl chloride fluorination.

The method can reduce the production cost, improve the product purity and is suitable for industrial production.

BRIEF DESCRIPTION OF THE DRAWINGS

FIG. 1 shows a schematic process flow diagram of a method for preparing sulfuryl fluoride by using sulfuryl chloride fluorination in the present application.

DETAILED DESCRIPTION OF EMBODIMENTS

Hereinafter, embodiments of the method for preparing sulfuryl fluoride by using sulfuryl chloride fluorination in the present application are specifically disclosed with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60 to 120 and 80 to 110 are listed for a particular parameter, it should be understood that the ranges of 60 to 110 and 80 to 120 are also contemplated. Additionally, if minimum range values 1 and 2 are listed, and maximum range values 3, 4, and 5 are listed, the following ranges are all contemplated: 1 to 3, 1 to 4, 1 to 5, 2 to 3, 2 to 4 and 2 to 5. In the present application, unless stated otherwise, the numerical range "a to b" denotes an abbreviated representation of any combination of real numbers between a and b, where both a and b are real numbers. For example, the numerical range "0 to 5" means that all real numbers between "0 to 5" have been listed herein, and "0 to 5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, in some embodiments sequentially. For example, the method comprising steps (a) and (b) indicates that the method may comprise steps (a) and (b) performed sequentially, and may further include steps (b) and (a) performed sequentially. For example, reference to "the method may further comprise step (c)" indicates that step (c) may be added to the method in any order, e.g., the method may comprise steps (a), (b) and (c), steps (a), (c) and (b), or also steps (c), (a) and (b), etc.

The terms "comprise" and "include" mentioned in the present application are open-ended, unless otherwise stated. For example, the terms "comprising" and "including" may mean that other components not listed may or may not also be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

As shown in FIG. 1, the method for preparing sulfuryl fluoride by using sulfuryl chloride fluorination in the present application comprises: a sulfuryl fluoride synthesis step (S1), and optionally a hydrogen fluoride complex synthesis step (S0), a sulfuryl fluoride alkali-washing step (S2), a compression-condensation step (S3), a solid phase-liquid phase centrifugal separation step (S4), an alkalization step (S5), a post-alkalization layering step (S6), an upper liquid purification step (S7) and a lower liquid purification step (S8).

In the sulfuryl fluoride synthesis step (S1), a solvent and a hydrogen fluoride complex are added to a reaction kettle, the reaction system is cooled to 10° C. or less, sulfuryl chloride is then added dropwise under atmospheric pressure while the temperature of the reaction system is controlled to be 60° C. or less, in some embodiments 20° C. to 45° C., to obtain sulfuryl fluoride.

By cooling the reaction system to 10° C. or less before the dropwise addition of sulfuryl chloride in the sulfuryl fluoride synthesis step, the reaction system is controlled in a temperature environment by which the reaction can proceed and the product purity is high, and by controlling the reaction temperature to be 60° C. or less, in some embodiments 20° C. to 45° C., throughout the dropwise addition of sulfuryl chloride, the quality of sulfuryl fluoride and the safety of the process can be ensured. Once the temperature of the reaction system exceeds 60° C., the reaction temperature may locally rise, resulting in reaction bumping and potential safety hazards during industrial production. On the contrary, once the reaction temperature is lower than 20° C., on one hand, more energy needs to be consumed to achieve this low-temperature environment, leading to a significant increase in production cost and unsuitability for industrial production; on the other hand, such a low-temperature environment is also unfavorable for the proceeding of the reaction, resulting in a decrease in the yield and purity of sulfuryl fluoride.

In some embodiments, the method of the present application further comprises a hydrogen fluoride complex synthesis step (S0), wherein a hydrogen fluoride complex represented by $R \cdot (HF)_n$ is synthesized by an acid-binding agent and hydrogen fluoride, wherein R represents an acid-binding agent molecule, n represents a number greater than 0 and less than 12, and optionally, n represents a number greater than 2 and less than 12. In the present application, by selecting the hydrogen fluoride complex represented by the above general formula $R \cdot (HF)_n$, the reaction of the hydrogen fluoride complex and sulfuryl chloride can be smoothly performed at the controlled temperature in the present application to generate sulfuryl fluoride, and the quality of sulfuryl fluoride and the safety of the process can be ensured.

In some embodiments, the above acid-binding agent is an organic weak alkali, optionally, the acid-binding agent is selected from organic tertiary amine or an azaaromatic hydrocarbon compound, and optionally, the acid-binding agent is at least one selected from trimethylamine, triethylamine, tri-n-propylamine, tri-n-butylamine, diisopropylethylamine, N,N,N,N-tetramethylpropanediamine and pyridine.

In some embodiments, the above hydrogen fluoride complex is at least one selected from an organic tertiary amine·hydrogen fluoride complex and an azaaromatic hydrocarbon·hydrogen fluoride complex, and optionally, the above hydrogen fluoride complex is at least one selected from a trimethylamine·hydrogen fluoride complex, a triethylamine·hydrogen fluoride complex, a tri-n-propylamine·hydrogen fluoride complex, a tri-n-butylamine·hydrogen fluoride complex, a diisopropylethylamine·hydrogen fluoride complex, an N,N,N,N-tetramethylpropanediamine·hydrogen fluoride complex and a pyridine·hydrogen fluoride complex.

In the present application, by using such a hydrogen fluoride complex, the reaction of the hydrogen fluoride complex and sulfuryl chloride can be smoothly performed at the controlled temperature in the present application to generate sulfuryl fluoride, and the quality of sulfuryl fluoride and the safety of the process can be ensured.

In some embodiments, the above solvent is a polar aprotic organic solvent, and optionally, the above solvent is at least one selected from acetonitrile, dimethylformamide, dimethylacetamide, nitromethane, ethyl acetate, butyl acetate, dimethyl carbonate, dichloromethane and cyclohexane.

The acid-binding agents and solvents used in the present application are both common basic chemicals that have the characteristics of a low price, mild reaction conditions, a simple process operation, etc. In the present application, by using these acid-binding agents and solvents, the sulfuryl fluoride synthesis reaction can be smoothly performed, and the production cost of sulfuryl fluoride can be reduced.

In some embodiments, the molar ratio of the amount of the above hydrogen fluoride complex to the amount of the sulfuryl chloride is 1:0.5 to 1:1.5, optionally 1:0.8 to 1:1.2.

In the present application, by controlling the molar ratio of the amount of the hydrogen fluoride complex to the amount of sulfuryl chloride as described above, the two can be smoothly reacted under the controlled temperature in the present application to generate sulfuryl fluoride, and the quality of sulfuryl fluoride and the safety of the process can be ensured.

In some embodiments, the acid-binding agent is further added to the reaction system before the sulfuryl chloride is added dropwise in step (S1).

In the present application, by further adding an acid-binding agent to the reaction system, the excess hydrogen fluoride that may be present in the product of step (S0) during the feeding of the hydrogen fluoride complex can be absorbed, and after absorbing hydrogen fluoride, these acid-binding agents can generate the hydrogen fluoride complex, which can further participate in the sulfuryl fluoride synthesis reaction.

In some embodiments, when the acid-binding agent is added to the reaction system, the molar ratio of the amount of the above acid binding agent to the amount of the above hydrogen fluoride complex is 0.1:1 to 1:1, optionally 0.4:1 to 0.8:1.

In the present application, by controlling the molar ratio of the amount of the acid-binding agent to the amount of the hydrogen fluoride complex as described above, excess hydrogen fluoride can be absorbed by using the acid-binding agent and thus does not affect the reaction, and after absorbing hydrogen fluoride, these acid-binding agents can generate a hydrogen fluoride complex, which can further participate in the sulfuryl fluoride synthesis reaction.

In some embodiments, the method of the present application further comprises a sulfuryl fluoride alkali-washing step (S2), wherein sulfuryl fluoride gas obtained in the above sulfuryl fluoride synthesis step is subjected to alkali washing with an alkali solution, and optionally, the method further comprises a compression-condensation step (S3) for condensing the alkali-washed sulfuryl fluoride into a liquid.

The product sulfuryl fluoride resulting from the sulfuryl fluoride synthesis step (S1) may be mixed with impurities such as the solvent, the acid-binding agent and the hydrogen chloride. In the present disclosure, these impurities can be effectively removed by means of the sulfuryl fluoride alkali-washing step (S2) to obtain high-purity sulfuryl fluoride. In addition, the alkali-washed sulfuryl fluoride is condensed into a liquid by means of the compression-condensation step (S3), which facilitates storage and use.

In some embodiments, the method of the present application further comprises a solid phase-liquid phase centrifugal separation step (S4), wherein the components of a solid phase and a liquid phase obtained in the above sulfuryl fluoride synthesis step (S1) are subjected to solid-liquid separation, and the liquid phase resulting from the above solid-liquid separation is recycled in the form of a mother liquor to the above sulfuryl fluoride synthesis step (S1).

After the sulfuryl fluoride synthesis step (S1) is completed, the other components (the solid phase and the liquid phase) except the product sulfuryl fluoride (the gas phase) are subjected to solid-liquid separation, and the liquid phase is recycled in the form of a mother liquor for continued use in the above sulfuryl fluoride synthesis step (S1). The incompletely reacted raw materials in the reaction system are recovered and recycled, which reduces the consumption of raw and auxiliary materials, improves the utilization rate of the reaction raw materials, reduces the cost of the discharge treatment of compounds, effectively reduces the production cost and improves the economic benefit.

In some embodiments, the method of the present application further comprises an alkalization step (S5), wherein the solid phase resulting from the above solid-liquid separation is alkalized with an alkalization liquid.

In the present application, by alkalizing the solid phase resulting from solid-liquid separation with an alkalization liquid, the proceeding of subsequent steps is facilitated and the recycling of the raw materials is achieved.

In some embodiments, the method of the present application further comprises: a post-alkalization layering step (S6), wherein the material obtained after the above alkalization step is separated into an upper liquid and a lower liquid; an upper liquid purification step (S7), wherein sodium hydroxide is added to the upper liquid for layering, an upper layer obtained after layering is subjected to rectification and recovery and then recycled to the above sulfuryl fluoride synthesis step (S1), and a lower layer obtained after layering is recycled to the above alkalization step (S5); and a lower liquid purification step (S8), wherein volatile components are removed from the lower liquid by means of evaporation, calcium chloride or calcium oxide is then added to remove fluorine, and sodium carbonate is then added to remove calcium.

In the present application, by means of the above post-alkalization layering step (S6), upper liquid purification step (S7) and lower liquid purification step (S8), all the raw materials can be fully recycled, by-products can also generate additional economic benefits after purification, and less three wastes are generated; in addition, the present application meets the emission standards of China and environmental protection requirements, and is suitable for industrial production.

Hereinafter, by taking the case where acetonitrile is used as a solvent and triethylamine is used as an acid-binding agent as an example, the reaction in each step of the present application is described in detail according to the process sequence.

Hydrogen Fluoride Complex Synthesis Step (S0)

Triethylamine ($Et_3N$) and hydrogen fluoride (HF) are reacted under full stirring to generate a triethylamine-hydrogen fluoride complex (hereinafter also referred to as a triethylamine hydrogen fluoride salt).

The specific reaction formula is as follows: $Et_3N+HF \rightarrow Et_3N\cdot(HF)_3$.

Sulfuryl Fluoride Synthesis Step (S1)

Sulfuryl chloride and the triethylamine hydrogen fluoride salt as raw materials, acetonitrile as a solvent and optionally triethylamine added as an acid-binding agent are reacted to obtain sulfuryl fluoride.

The specific reaction formula is as follows: $Et_3N\cdot(HF)_3+SO_2Cl_2 \rightarrow SO_2F_2+Et_3N\cdot HCl$ Sulfuryl Fluoride Alkali-Washing Step (S2)

By means of the above sulfuryl fluoride synthesis step (S1), the gas-phase sulfuryl fluoride gas is generated, in which impurities such as acetonitrile, triethylamine and HCl are inevitably mixed. A sulfuryl fluoride alkali-washing step (S2) is performed, wherein sulfuryl fluoride is introduced into an alkali-washing tower and washed with a low-concentration sodium hydroxide solution to absorb impurities. An absorption liquid obtained from the bottom of the tower, as wastewater, is desalted and then is delivered for a sewage treatment in the plant area.

Compression-Condensation Step (S3)

After the alkali-washed sulfuryl fluoride resulting from the sulfuryl fluoride alkali-washing step (S2) is confirmed to meet the product quality standards, the alkali-washed sulfuryl fluoride can be condensed into a liquid by means of a compressor as required, for storage and use.

Solid Phase-Liquid Phase Centrifugal Separation Step (S4)

The solid phase and liquid phase obtained after the above sulfuryl fluoride synthesis step (S1) is completed are subjected to solid-liquid separation by using, for example, a scraper centrifuge or a horizontal scraper centrifuge.

The liquid phase, the main components of which are unreacted sulfuryl chloride, acetonitrile and triethylamine, are recycled in the form of a mother liquor for continued use in the above sulfuryl fluoride synthesis step (S1).

The solid phase, the main component of which is a triethylamine hydrogen chloride salt incorporated with acetonitrile, triethylamine, the triethylamine hydrogen fluoride salt, etc., is delivered for the subsequent alkalization step (S5).

Alkalization Step (S5)

An alkalization liquid with a concentration of 10-30% (such as a sodium hydroxide solution) is introduced into an alkalization kettle, and the solid phase obtained in the above solid-liquid phase centrifugal separation step (S4) is put into the kettle. After alkalization, the composition of the material comprises $Et_3N$, NaCl, NaF and acetonitrile.

Post-Alkalization Layering Step (S6)

The material comprising $Et_3N$, NaCl, NaF and acetonitrile resulting from the above alkalization step (S5) is subjected to liquid-liquid separation, for example, by means of a disc centrifuge, etc. by using the characteristic of an organic phase being immiscible with an aqueous phase, and left to stand for separation into an upper liquid (organic phase) and a lower liquid (aqueous phase).

Upper Liquid Purification Step (S7)

The upper liquid (organic phase) resulting from the above post-alkalization layering step (S6) is mainly made up of $Et_3N$ in which a trace amount of water and a trace amount of acetonitrile are incorporated. The upper liquid is dewatered by adding sodium hydroxide (NaOH) and then left to stand for layering. The upper layer, which is $Et_3N$ (containing a trace amount of acetonitrile), is subjected to rectification and recovery and then recycled to the above sulfuryl fluoride synthesis step (S1). The lower layer, which is alkaline liquor, is recycled to the above alkalization step (S5).

Upper Liquid Purification Step (S8)

The lower liquid (aqueous phase) resulting from the above post-alkalization layering step (S6) mainly contains NaCl, NaF and acetonitrile (freely soluble in water). Firstly, acetonitrile is removed by means of single-effect evaporation.

The rest is mainly NaCl and NaF containing the element fluorine. Once such industrial wastewater is discharged into the natural environment, it is likely to bring harm to the environment and the human health. Therefore, fluorine is removed by adding calcium chloride or calcium oxide, and for example, fluorine is reduced to 10 ppm or less. The specific reaction is as follows:

$$CaCl_2+NaF \rightarrow CaF_2\downarrow+NaCl, \text{ or}$$

$$CaO+H_2O \rightarrow Ca(OH)_2, \text{ or } Ca(OH)_2+NaF \rightarrow CaF_2\downarrow+NaOH,$$

wherein the generated calcium fluoride precipitate can be disposed as general waste. The generated NaOH can be removed using a dilute hydrochloric acid solution by means of the following reaction: $NaOH+HCl \rightarrow NaCl+H_2O$.

As mentioned above, in order to remove the element fluorine, calcium chloride or calcium oxide is added, which may lead to excess calcium in the resulting material. Once the calcium content in wastewater exceeds standard, adverse effects such as blockage of equipment or pipelines may occur.

Therefore, the superfluous calcium is removed by adding sodium carbonate. The specific reaction is as follows:

$$CaCl_2+Na_2CO_3 \rightarrow CaCO_3\downarrow+NaCl, \text{ or}$$

$$Ca(OH)_2+Na_2CO_3 \rightarrow CaCO_3\downarrow+NaOH,$$

wherein the generated calcium carbonate precipitate can be disposed as general waste, and the superfluous $Na_2CO_3$ and the generated NaOH are removed with a dilute hydrochloric acid solution.

As mentioned above, after fluorine and calcium are removed, saline (NaCl solution) is concentrated by means of single-effect evaporation or multi-effect evaporation and is packaged and sold after reaching a target concentration, thereby obtaining additional economic benefits. From the viewpoint of using continuous production to improve the production efficiency, the multi-effect evaporation (such as three-effect evaporation or five-effect evaporation) is used. The condensate resulting from concentration and evaporation is delivered for a sewage treatment in the plant area.

In summary, by means of the sulfuryl fluoride synthesis method in the present application, the following effects can be obtained: (1) the raw and auxiliary materials used in this process are all common basic chemicals that have the characteristics of a low price, mild reaction conditions, a simple process operation, etc. and therefore, sulfuryl fluoride has a low production cost and a high purity and is suitable for industrial production. The process route of the present application also can achieve additional effects: (2) the raw materials all can be fully repeatedly recycled, thereby improving the utilization rate of the reaction raw materials and improving the economic benefits; and (3) the post-treatment is sufficient, additional economic benefits can be generated after the purification of by-products, and less three wastes are generated; in addition, the present application meets the emission standards of China and environmental protection requirements.

EXAMPLES

Hereinafter, the examples of the present application will be explained. The examples described below are exemplary and are merely for explaining the present application, and should not be construed as limiting the present application. The examples in which no techniques or conditions are specified are based on the techniques or conditions described in documents in the art or according to product instructions. The reagents or instruments used therein for which no manufacturers are specified are all conventional products that are commercially available.

Example 1

(1) Hydrogen Fluoride Complex Synthesis Step (S0)

Chilled water inlet and outlet valves of a tubular reactor were switched on in advance and cooled down to −10° C.; feed valves of hydrogen fluoride and triethylamine were switched on, and the flow rates of the two materials were adjusted; and 60 $m^3$ of liquid hydrogen fluoride and 120 $m^3$ of triethylamine were continuously conveyed by means of metering pumps to a tubular reactor and fully mixed to obtain a triethylamine hydrogen fluoride salt.

(2) Sulfuryl Fluoride Synthesis Step (S1)

100 $m^3$ of acetonitrile, 600 mol of triethylamine and 1000 mol of triethylamine hydrogen fluoride salt were added to a polytetrafluoroethylene-lined reaction kettle; stirring was started; after the addition was completed, chilled water was introduced into a jacket, and the reaction system was cooled to 10° C. by means of refrigerator and circulating cooling water pump program settings; 1000 mol of sulfuryl chloride was then slowly added dropwise under atmospheric pressure; and the temperature of the reaction system was controlled to 60° C. throughout the dropwise addition of sulfuryl chloride. Sulfuryl fluoride gas generated during the reaction process was collected while the dropwise addition was carried out, and the dropwise addition was completed within 3 h. The temperature was maintained at 50° C. to 60° C. for 2 h until no gas was generated.

(3) Sulfuryl Fluoride Alkali-Washing Step (S2)

The gas-phase sulfuryl fluoride gas resulting from the above sulfuryl fluoride synthesis step (S1) was introduced into an alkali-washing tower and washed with a 3% sodium hydroxide solution to obtain 890 mol of sulfuryl fluoride, with a yield of 89%. The purity of sulfuryl fluoride was 99.1% as determined by gas chromatography.

(4) Solid-Liquid Phase Centrifugal Separation Step (S4)

The materials in the reaction kettle in the above sulfuryl fluoride synthesis step (S1) were centrifuged by using a scraper centrifuge and filtered to obtain a white crystal substance. The centrifuged mother liquor was recycled to the sulfuryl fluoride synthesis step (S1). The main component of the white crystal was a triethylamine hydrogen chloride salt as confirmed by gas chromatography.

(5) Alkalization Step (S5)

A sodium hydroxide solution with a concentration of 30% was introduced into an alkalization kettle, the crystal substance obtained in the above solid phase-liquid phase centrifugal separation step (S4) was put into the kettle, and alkalization was performed.

(6) Post-Alkalization Layering Step (S6)

The alkalized material obtained in the above alkalization step (S5) was subjected to liquid-liquid separation by means of a disc centrifuge, and left to stand for separation into an upper liquid and a lower liquid.

(7) Upper Liquid Purification Step (S7)

The upper liquid, which was an organic phase, was dewatered by adding 5 kg of sodium hydroxide and then left to stand for layering. The upper layer, which was $Et_3N$ (containing a trace amount of acetonitrile), was subjected to rectification and recovery and then recycled to the above sulfuryl fluoride synthesis step (S1). The lower layer, which was alkaline liquor, was recycled to the above alkalization step (S5).

(8) Upper Liquid Purification Step (S8)

The lower liquid was an aqueous phase. Firstly, acetonitrile was removed by single-effect evaporation.

20 mol of calcium chloride was added, the stirring frequency was set to 20±1 HZ, and the fluorine content of the material was confirmed to be 5 ppm by means of alizarin complex colorimetry. The generated calcium fluoride precipitate can be disposed as general waste.

Then, 4 mol of sodium carbonate was added, the stirring frequency was set to 20±1 HZ, and the calcium content of the material was confirmed to be 3 ppm by means of ICP-OES (inductively coupled plasma-emission spectroscopy). The generated calcium carbonate precipitate can be disposed as general waste.

Then, a dilute hydrochloric acid solution with a concentration of 31% was added, and after treatment, the pH of the material was adjusted to be 7.

The obtained material was concentrated by five-effect evaporation to obtain an NaCl solution. The condensate resulting from concentration and evaporation was delivered for a sewage treatment in the plant area.

Example 2

The synthesis was performed in the same manner as in Example 1, except that the reaction system was cooled to 9° C. before the dropwise addition of sulfuryl chloride in the sulfuryl fluoride synthesis step (S1) and the temperature of the reaction system was controlled to be 45° C. throughout the dropwise addition of sulfuryl chloride.

Example 3

The synthesis was performed in the same manner as in Example 1, except that the reaction system was cooled to 7° C. before the dropwise addition of sulfuryl chloride in the sulfuryl fluoride synthesis step (S1) and the temperature of the reaction system was controlled to be 20° C. throughout the dropwise addition of sulfuryl chloride.

Example 4

The synthesis was performed in the same manner as in Example 1, except that the reaction system was cooled to 5° C. before the dropwise addition of sulfuryl chloride in the sulfuryl fluoride synthesis step (S1) and the temperature of the reaction system was controlled to be 10° C. throughout the dropwise addition of sulfuryl chloride.

Example 5

(1) Hydrogen Fluoride Complex Synthesis Step (S0)

Chilled water inlet and outlet valves of a tubular reactor were switched on in advance and cooled down to −10° C.; feed valves of hydrogen fluoride and pyridine were switched on, and the flow rates of the two materials were adjusted; and 60 $m^3$ of liquid hydrogen fluoride and 70 $m^3$ of pyridine were continuously conveyed by means of metering pumps to a tubular reactor and fully mixed to obtain a pyridine hydrogen fluoride salt.

(2) Sulfuryl Fluoride Synthesis Step (S1)

100 $m^3$ of N,N-dimethylformamide, 600 mol of pyridine and 1000 mol of pyridine hydrogen fluoride salt were added to a polytetrafluoroethylene-lined reaction kettle; stirring was started; after the addition was completed, chilled water was introduced into a jacket, and the reaction system was cooled to 9° C. by means of refrigerator and circulating cooling water pump program settings; 1000 mol of sulfuryl chloride was then slowly added dropwise under atmospheric pressure; and the temperature of the reaction system was controlled to 45° C. throughout the dropwise addition of sulfuryl chloride. Sulfuryl fluoride gas generated during the reaction process was collected while the dropwise addition was carried out, and the dropwise addition was completed within 3 h. The temperature was maintained at 50° C. to 60° C. for 2 h until no gas was generated.

The subsequent steps (S2) to (S8) were performed in the same manner as in Example 1.

Comparative Example 1

The synthesis was performed in the same manner as in Example 1, except that the reaction system was cooled to 15° C. before the dropwise addition of sulfuryl chloride in the sulfuryl fluoride synthesis step (S1) and the temperature of the reaction system was controlled to be 65° C. throughout the dropwise addition of sulfuryl chloride.

The relevant data of Examples 1 to 5 and Comparative Example 1 above were summarized in Table 1 below.

It can be seen from the above results that in the step of synthesizing sulfuryl fluoride by using the hydrogen fluoride complex and sulfuryl chloride in Examples 1 to 5, by cooling the reaction system to 10° C. or less in advance, then dropwise adding sulfuryl chloride, and controlling the temperature of the reaction system to be 60° C. or less, the yield and purity of the obtained sulfuryl fluoride were both high. In particular, in Examples 2 and 3 in which the reaction system was controlled to be 20° C. to 45° C., the yield and purity of sulfuryl fluoride were higher.

It should be noted that the present application is not limited to the above embodiments. The above embodiments are exemplary only, and any embodiment that has substantially the same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

What is claimed is:

1. A method for preparing sulfuryl fluoride by using sulfuryl chloride fluorination, comprising:
- synthesizing sulfuryl fluoride synthesis, comprising:
  - adding a solvent and a hydrogen fluoride complex to a reaction kettle;
  - cooling the solvent and the hydrogen fluoride complex in the reaction kettle to 10° C. or below; and
  - after the solvent and the hydrogen fluoride complex in the reaction kettle is cooled to 10° C. or below, adding sulfuryl chloride dropwise under atmospheric pressure while a temperature of the reaction kettle is controlled to be 60° C. or less to obtain sulfuryl fluoride.

2. The method according to claim 1, wherein the temperature of the reaction kettle is controlled to be 20° C. to 45° C. while adding the sulfuryl chloride dropwise under the atmospheric pressure.

TABLE 1

| | Type of hydrogen fluoride complex | Type of solvent | System temperature before the dropwise addition of sulfuryl chloride (° C.) | System temperature throughout the dropwise addition of sulfuryl chloride (° C.) | Yield | Purity |
|---|---|---|---|---|---|---|
| Example 1 | Triethylamine hydrogen fluoride salt | Acetonitrile | 10 | 60 | 89% | 99.1% |
| Example 2 | Triethylamine hydrogen fluoride salt | Acetonitrile | 9 | 45 | 93% | 99.5% |
| Example 3 | Triethylamine hydrogen fluoride salt | Acetonitrile | 7 | 20 | 95% | 99.6% |
| Example 4 | Triethylamine hydrogen fluoride salt | Acetonitrile | 5 | 10 | 90% | 99.2% |
| Example 5 | Pyridine hydrogen fluoride salt | N,N-Dimethylformamide | 9 | 45 | 88% | 98.5% |
| Comparative Example 1 | Triethylamine hydrogen fluoride salt | Acetonitrile | 15 | 65 | 72% | 87.3% |

3. The method according to claim 1, further comprising:

hydrogen fluoride complex synthesis, wherein a hydrogen fluoride complex represented by $R\cdot(HF)_n$ is synthesized by an acid-binding agent and hydrogen fluoride, wherein R represents an acid-binding agent molecule, n represents a number greater than 0 and less than 12.

4. The method according to claim 3, wherein the acid-binding agent is an organic weak alkali.

5. The method according to claim 1, wherein the hydrogen fluoride complex is at least one selected from an organic tertiary amine hydrogen fluoride complex and an azaaromatic hydrocarbon hydrogen fluoride complex.

6. The method according to claim 1, wherein the acid-binding agent is further added to the reaction kettle before the sulfuryl chloride is added dropwise.

7. The method according to claim 6, wherein a molar ratio of an amount of the acid-binding agent to an amount of the hydrogen fluoride complex is 0.1:1 to 1:1.

8. The method according to claim 1, wherein the solvent is a polar aprotic organic solvent.

9. The method according to claim 1, wherein a molar ratio of an amount of the hydrogen fluoride complex to an amount of the sulfuryl chloride is 1:0.5 to 1:1.5.

10. The method according to claim 1, further comprising:

sulfuryl fluoride alkali-washing, wherein sulfuryl fluoride gas resulting from the sulfuryl fluoride synthesis is subjected to alkali washing with an alkali solution.

11. The method according to claim 10, further comprising:

compression-condensation for condensing the alkali-washed sulfuryl fluoride into a liquid.

12. The method according to claim 1, further comprising:

solid phase-liquid phase centrifugal separation, wherein components of a solid phase and a liquid phase resulting from the sulfuryl fluoride synthesis are subjected to solid-liquid separation;

wherein a liquid phase resulting from the solid-liquid separation is recycled in a form of a mother liquor to the sulfuryl fluoride synthesis.

13. The method according to claim 12, further comprising:

alkalization, comprising alkalizing a solid phase resulting from the solid-liquid separation with an alkalization liquid.

14. The method according to claim 13, further comprising:

post-alkalization layering, comprising separating the material obtained after the alkalization into an upper liquid and a lower liquid;

upper liquid purification, comprising adding sodium hydroxide to the upper liquid for layering, wherein an upper layer obtained after layering is subjected to rectification and recovery and then recycled to the sulfuryl fluoride synthesis, and a lower layer obtained after layering is recycled to the alkalization; and lower liquid purification, wherein volatile components are removed from the lower liquid by means of evaporation, calcium chloride or calcium oxide is then added to remove fluorine, and sodium carbonate is then added to remove calcium.

15. The method according to claim 1, wherein the solvent comprises at least one of dimethylformamide, dimethylacetamide, nitromethane, ethyl acetate, butyl acetate, dimethyl carbonate, dichloromethane, or cyclohexane.

* * * * *